(12) United States Patent
Mourkogiannis et al.

(10) Patent No.: US 12,067,214 B2
(45) Date of Patent: Aug. 20, 2024

(54) UPDATING AVATAR CLOTHING FOR A USER OF A MESSAGING SYSTEM

(71) Applicant: Snap Inc., Santa Monica, CA (US)

(72) Inventors: Celia Nicole Mourkogiannis, Los Angeles, CA (US); Evan Spiegel, Los Angeles, CA (US); Kevin Dechau Tang, Los Angeles, CA (US); Kaveh Anvaripour, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/359,390

(22) Filed: Jun. 25, 2021

(65) Prior Publication Data

US 2021/0405831 A1 Dec. 30, 2021

Related U.S. Application Data

(60) Provisional application No. 63/044,062, filed on Jun. 25, 2020.

(51) Int. Cl.
*G06F 3/0482* (2013.01)
*G06K 7/14* (2006.01)
(Continued)

(52) U.S. Cl.
CPC ......... *G06F 3/0482* (2013.01); *G06K 7/1413* (2013.01); *G06V 20/10* (2022.01);
(Continued)

(58) Field of Classification Search
CPC ............. G06F 3/0482; G06K 7/1413; G06K 9/00664; H04L 67/306; H04L 51/08; H04N 5/23293
See application file for complete search history.

(56) References Cited

U.S. PATENT DOCUMENTS 5,880,731 A   3/1999   Liles et al.
6,023,270 A   2/2000   Brush, II et al.
(Continued)

FOREIGN PATENT DOCUMENTS

CN   109863532   6/2019
CN   110168478   8/2019
(Continued)

OTHER PUBLICATIONS

"International Application Serial No. PCT/US2021/039259, International Search Report mailed Oct. 19, 2021", 3 pgs.
(Continued)

*Primary Examiner* — Dino Kujundzic
(74) *Attorney, Agent, or Firm* — Schwegman Lundberg & Woessner, P.A.

(57) ABSTRACT

Aspects of the present disclosure involve a system comprising a computer-readable storage medium storing a program and method for updating avatar clothing of a user of a messaging system. The program and method provide for receiving, by a messaging application running on a device of a user, a request to identify at least one object depicted in an image captured by a device camera; determining, in response to receiving the request, an attribute of an object depicted in the image; selecting, from plural candidate articles of clothing for an avatar of the user, an article of clothing that is associated with the attribute of the object; and displaying the selected article of clothing with the avatar of the user.

17 Claims, 11 Drawing Sheets

(51) Int. Cl.
*G06V 20/10* (2022.01)
*H04L 67/306* (2022.01)
*H04L 51/08* (2022.01)
*H04N 23/63* (2023.01)

(52) U.S. Cl.
CPC ............ *H04L 67/306* (2013.01); *H04L 51/08* (2013.01); *H04N 23/63* (2023.01)

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,044,849 B2 | 8/2018 | Li et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,270,983 B1* | 4/2019 | Van Os .................. H04N 7/147 |
| 10,362,219 B2 | 7/2019 | Wilson et al. |
| 10,452,896 B1* | 10/2019 | Weise ................ G06K 9/00281 |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,659,405 B1 | 5/2020 | Chang et al. |
| 11,178,335 B2* | 11/2021 | Van Os .................. G06F 3/0304 |
| 11,227,442 B1* | 1/2022 | Goodrich ............ G06F 3/04883 |
| 2002/0067362 A1 | 6/2002 | Agostino Nocera et al. |
| 2002/0169644 A1 | 11/2002 | Greene |
| 2005/0131776 A1* | 6/2005 | Perotti ............... G06Q 30/0643 |
| | | 705/27.2 |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0273711 A1 | 11/2007 | Maffei |
| 2008/0158222 A1 | 7/2008 | Li et al. |
| 2008/0201638 A1* | 8/2008 | Nair ...................... H04W 4/029 |
| | | 715/706 |
| 2009/0016617 A1 | 1/2009 | Bregman-amitai et al. |
| 2009/0033667 A1* | 2/2009 | Xu ........................... G06T 19/00 |
| | | 345/474 |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0251484 A1* | 10/2009 | Zhao .................. H04M 1/72427 |
| | | 345/591 |
| 2009/0265604 A1 | 10/2009 | Howard et al. |
| 2009/0300525 A1* | 12/2009 | Jolliff ................. H04M 1/72451 |
| | | 715/764 |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0175022 A1* | 7/2010 | Diehl .................... G06F 3/0481 |
| | | 715/764 |
| 2010/0203968 A1 | 8/2010 | Gill et al. |
| 2010/0227682 A1 | 9/2010 | Reville et al. |
| 2011/0025689 A1* | 2/2011 | Perez ..................... A63F 13/213 |
| | | 345/420 |

(56) References Cited

U.S. PATENT DOCUMENTS

| | | |
|---|---|---|
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0252344 A1* | 10/2011 | van Os ............... A63F 13/63 717/173 |
| 2012/0106796 A1 | 5/2012 | Jones et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0276997 A1* | 11/2012 | Chowdhary ........ A63F 13/69 463/31 |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0282808 A1* | 10/2013 | Sadanandan ........ G06Q 10/10 709/204 |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0055860 A1* | 2/2015 | Bhardwaj ........... G06K 9/66 382/165 |
| 2015/0206349 A1 | 7/2015 | Rosenthal et al. |
| 2015/0212664 A1* | 7/2015 | Freer ................. G06F 3/0485 715/728 |
| 2016/0035061 A1* | 2/2016 | Gadre ................ G06T 19/00 345/473 |
| 2016/0134840 A1 | 5/2016 | Mcculloch |
| 2016/0180391 A1* | 6/2016 | Zabaneh .......... G06F 16/9535 705/14.58 |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0005420 A1 | 1/2018 | Bondich et al. |
| 2018/0018729 A1* | 1/2018 | Grimes ............. G06Q 30/0255 |
| 2018/0047200 A1 | 2/2018 | O'hara et al. |
| 2018/0091732 A1* | 3/2018 | Wilson .............. G06T 7/70 |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0158735 A1 | 5/2019 | Wilson et al. |
| 2019/0171338 A1 | 6/2019 | Voss et al. |
| 2019/0188920 A1 | 6/2019 | Mcphee et al. |
| 2019/0282903 A1 | 9/2019 | Brody et al. |
| 2019/0318405 A1* | 10/2019 | Hu .................... G06F 16/55 |
| 2020/0051341 A1* | 2/2020 | Lee ................... G06T 19/20 |
| 2020/0090391 A1* | 3/2020 | Presley ............. G06Q 20/308 |
| 2020/0306640 A1* | 10/2020 | Kolen ................. G06N 3/047 |
| 2020/0310601 A1* | 10/2020 | Anvaripour ........ G06F 3/0482 |
| 2020/0410575 A1* | 12/2020 | Grantham .......... G06K 7/1413 |
| 2021/0211487 A1* | 7/2021 | Lee ................... H04L 67/06 |
| 2021/0303077 A1* | 9/2021 | Anvaripour ........ G06F 3/0488 |
| 2021/0409535 A1 | 12/2021 | Mourkogiannis et al. |
| 2022/0122309 A1* | 4/2022 | Kim .................. G06V 20/30 |

FOREIGN PATENT DOCUMENTS

| | | |
|---|---|---|
| CN | 115735229 A | 3/2023 |
| CN | 115803723 A | 3/2023 |
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | WO-2021263208 A1 | 12/2021 |
| WO | WO-2021263210 A1 | 12/2021 |

OTHER PUBLICATIONS

"International Application Serial No. PCT/US2021/039259, Written Opinion mailed Oct. 19, 2021", 4 pgs.

"International Application Serial No. PCT/US2021/039261, International Search Report mailed Oct. 15, 2021", 3 pgs.

"International Application Serial No. PCT/US2021/039261, Written Opinion mailed Oct. 15, 2021", 4 pgs.

"U.S. Appl. No. 17/359,402, Non Final Office Action mailed Feb. 27, 2023", 13 pgs.

"International Application Serial No. PCT/US2021/039259, International Preliminary Report on Patentability mailed Jan. 5, 2023", 6 pgs.

"International Application Serial No. PCT/US2021/039261, International Preliminary Report on Patentability mailed Jan. 5, 2023", 6 pgs.

* cited by examiner

UPDATING AVATAR CLOTHING FOR A USER OF A MESSAGING SYSTEM

CROSS-REFERENCE TO RELATED APPLICATION

This patent application claims the benefit of U.S. Provisional Patent Application No. 63/044,062, filed Jun. 25, 2020, entitled "UPDATING AVATAR CLOTHING FOR A USER OF A MESSAGING SYSTEM", which is incorporated by reference herein in its entirety.

TECHNICAL FIELD

The present disclosure relates generally to a messaging system, including updating an avatar of a user of a messaging system.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

A messaging system typically allow users to exchange content items (e.g., messages, images and/or video) with one another in a message thread. A messaging system may implement or otherwise work in conjunction with an avatar system configured to maintain avatar representations of users for use in messaging.

The disclosed embodiments provide for a messaging client to detect articles of clothing in a captured image (e.g., a live video feed captured by a device camera, or an image selected from a photo library), and to present a user interface with user-selectable avatar outfits that match or are otherwise similar to the detected articles of clothing. For example, the messaging client determines attributes (e.g., types of clothing, color, size, and/or brand name) of articles of clothing detected in the captured image. The messaging client then provides for searching a database which stores available articles of clothing and/or outfits for avatars based on the attributes, and for selecting one or more outfits that most closely matches the attributes. The messaging client then presents a user interface which displays the selected outfits together with interface elements to update the user avatar based on the selected outfits.

Figure 1:
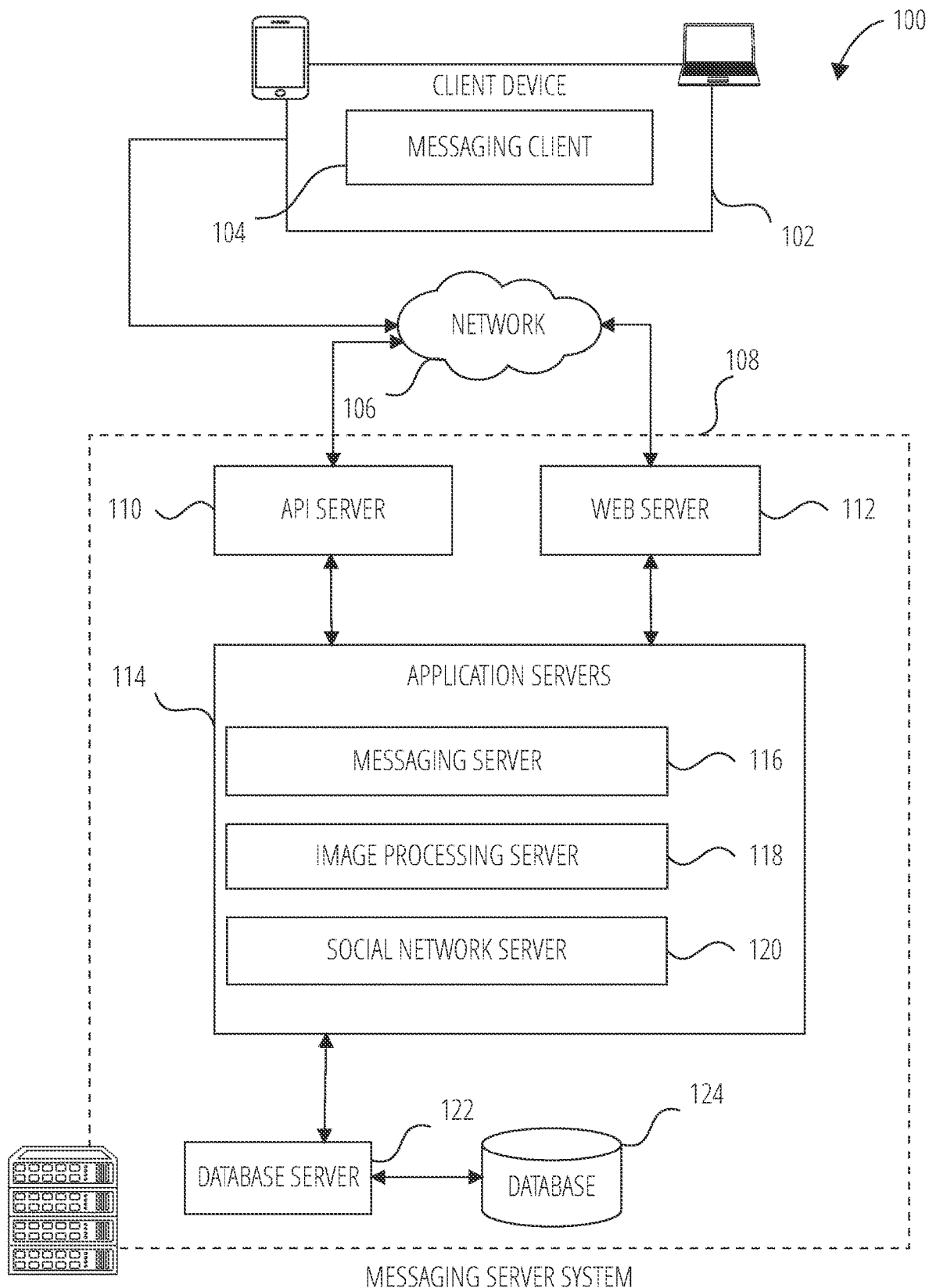
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 114. The application servers 114 are communicatively coupled to a database server 122, which facilitates access to a database 124 that stores data associated with messages processed by the application servers 114. Similarly, a web server 112 is coupled to the application servers 114, and provides web-based interfaces to the application servers 114. To this end, the web server 112 processes incoming network requests over the Hypertext Transfer Protocol (HTTP) and several other related protocols.

The Application Program Interface (API) server 110 receives and transmits message data (e.g., commands and message payloads) between the client device 102 and the application servers 114. Specifically, the Application Program Interface (API) server 110 provides a set of interfaces (e.g., routines and protocols) that can be called or queried by the messaging client 104 in order to invoke functionality of the application servers 114. The Application Program Interface (API) server 110 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 116, and for possible access by another messaging client 104, the settings of a collection of media data (e.g., Story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 116, an image processing server 118, and a social network server 120. The messaging server 116 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called Stories or galleries). These collections are then made available to the messaging client 104. Other processor and memory intensive processing of data may also be performed server-side by the messaging server 116, in view of the hardware requirements for such processing.

The application servers 114 also include an image processing server 118 that is dedicated to performing various image processing operations, typically with respect to images or video within the payload of a message sent from or received at the messaging server 116.

Figure 3:
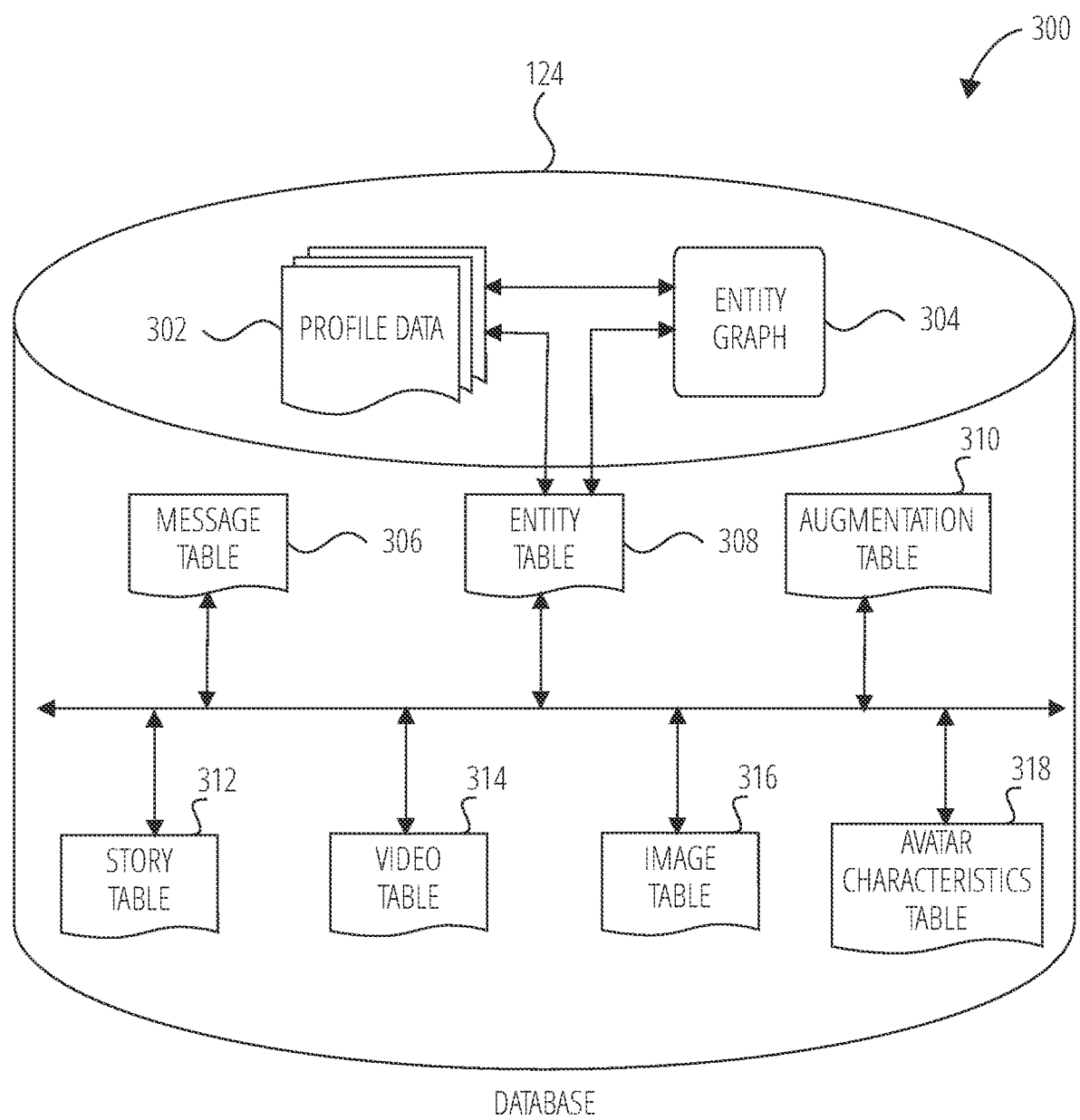
FIG. 3 is a diagrammatic representation of a data structure as maintained in a database, in accordance with some example embodiments.

The social network server 120 supports various social networking functions and services and makes these functions and services available to the messaging server 116. To this end, the social network server 120 maintains and accesses an entity graph 304 (as shown in FIG. 3) within the database 124. Examples of functions and services supported by the social network server 120 include the identification of other users of the messaging system 100 with which a particular user has relationships or is "following," and also the identification of other entities and interests of a particular user.

Figure 2:
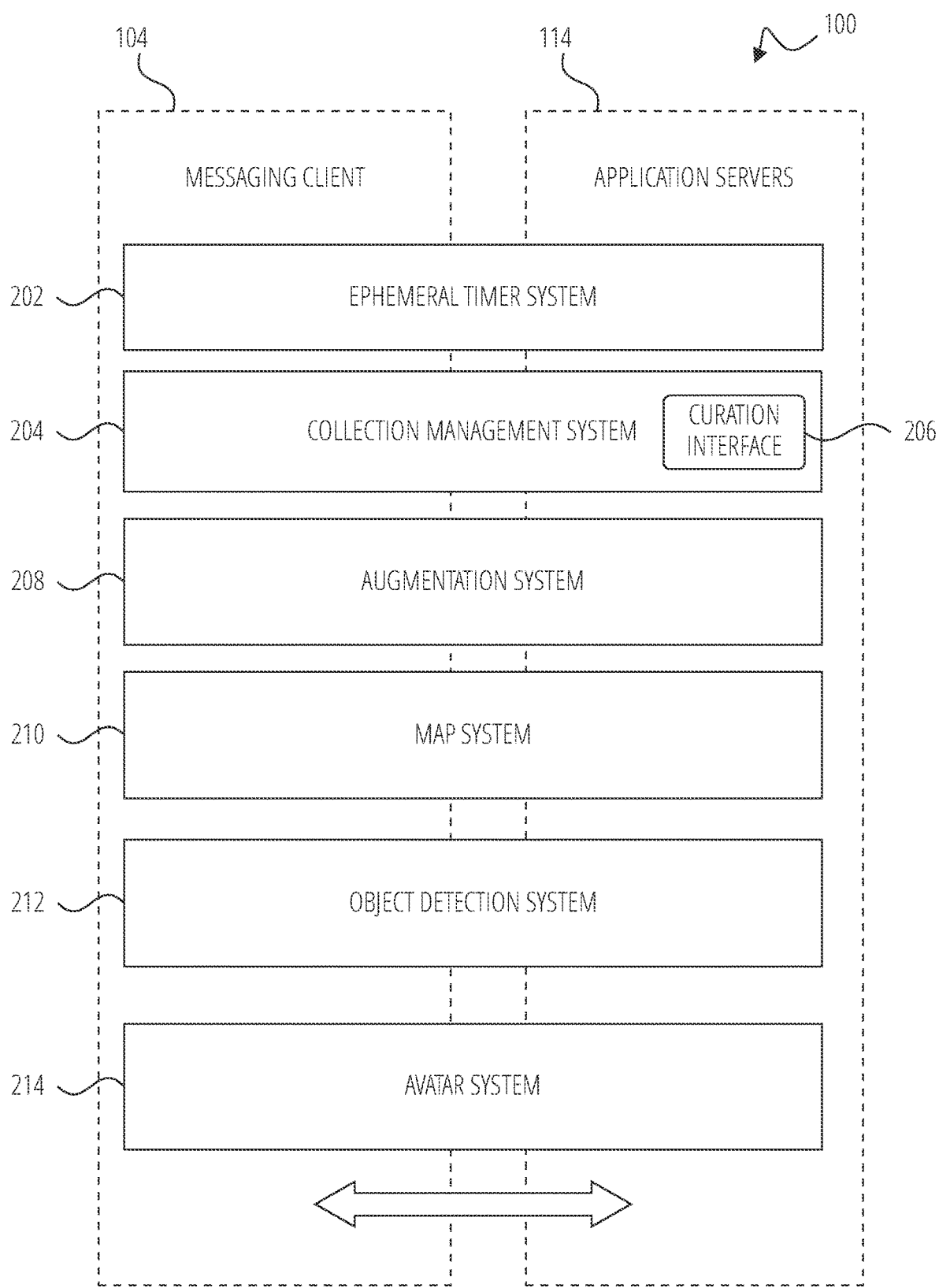
FIG. 2 is a diagrammatic representation of a messaging system that has both client-side and server-side functionality, in accordance with some example embodiments.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, an object detection system 212, and/or an avatar system 214.

The ephemeral timer system 202 is responsible for enforcing the temporary or time-limited access to content by the messaging client 104 and the messaging server 116. The ephemeral timer system 202 incorporates a number of timers that, based on duration and display parameters associated with a message, or collection of messages (e.g., a Story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 124 and accessed through the database server 122.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in association with profile data 302, discussed below) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The object detection system 212 provides various object detection functions within the context of the messaging system 100. The object detection system 212 may employ one or more object classifiers to identify objects depicted in a captured image. The image may correspond to a live video feed captured by a camera (e.g., rear or front facing camera) of the client device 102. Alternatively or in addition, the image may correspond to an image (e.g., photo) stored in association with the user of the client device 102 (e.g., a photo library).

In one or more embodiments, the object detection system 212 is configured to implement or otherwise access object recognition algorithms (e.g., including machine learning algorithms) configured to scan the captured image, and to detect/track the movement of objects within the image. By way of non-limiting example, detectable objects within an image include: a human face, parts of a human body, animals and parts thereof, landscapes, objects in nature, non-living objects (e.g., articles of clothing, chairs, books, cars, buildings, other structures), illustrations of objects (e.g., on posters and/or flyers), text-based objects, equation-based objects and the like.

In addition, the object detection system 212 is configured to determine or otherwise access attributes of objects. For a particular object, the object detection system 212 may determine or retrieve attributes such as a name/type, genre, color, size, shape, texture, environmental factors (e.g., geolocation, time, weather), and/or other supplemental information (e.g., a song title/artist for an object corresponding to media).

With respect to the environmental factors, the object detection system 212 may receive information from the messaging client 104 to identify the weather, geographical location, time, and so forth around the client device 102 (e.g., via device sensors). The object detection system 212 may rank the retrieved attributes based on relevance, such as based on their association with the one or more environmental factors. Other machine learning techniques may be employed to select and rank retrieved attributes. The object detection system 212 may select an object from the list of objects detected in the captured image that is associated with the highest ranked attributes, and may send an indication of the selected object to the messaging client 104. Alternatively or in addition, the object detection system 212 may provide for communicating one or more attributes (e.g., name/type) for each detected object, and/or an indication of the ranking of the attributes to the messaging client 104.

In one or more embodiments, the object detection system 212 determines that one of the attributes corresponds to a keyword that has been sponsored by a third party. For example, third parties may sponsor or pay for certain keywords to be ranked higher than others. In response to determining that a given attribute corresponds to a sponsored keyword, the object detection system 212 may provide for a higher ranking of that attribute relative to other attributes.

The avatar system 214 provides various avatar-related functions within the context of the messaging system 100. The avatar system 214 is configured to allow a user to create, edit and/or otherwise maintain a personalized avatar corresponding to a graphical representation of the user with respect to the messaging system 100. For example, in creating and/or editing an avatar, the user may select physical features for the avatar, such as face shape, skin tone, hair features (e.g., color, length, type, style), jaw shape, eyebrows, mouth and the like. Moreover, the user may select an outfit for the avatar, by selecting articles of clothing such as a shirt, pants/shorts, a jacket, shoes, headwear and/or other traditional clothing items. in one or more embodiments, the selected physical features and outfit for the avatar of the user persists across multiple interfaces of the messaging system 100 (e.g., by being stored in association with the profile data 302 as discussed below).

In one or more embodiments, the avatar system 214 provides for preset templates and/or poses for generating different avatar images (e.g., for conveying respective user statuses, activities and/or moods). For example, the different avatar images are user selectable for including in messages, media content items, Stories and the like. Avatars are also usable by the map system 210 as noted above, to indicate the location of users within a map view. Moreover, the messaging client 104 in conjunction with the messaging server system 108 may display avatar images within various interfaces (e.g., chat interface, reply interface, and the like) to indicate user presence, status, activity and/or mood.

FIG. 3 is a schematic diagram illustrating data structures 300, which may be stored in the database 124 of the messaging server system 108, according to certain examples. While the content of the database 124 is shown to comprise a number of tables, it will be appreciated that the data could be stored in other types of data structures (e.g., as an object-oriented database).

The database 124 includes message data stored within a message table 306. This message data includes, for any particular one message, at least message sender data, message recipient (or receiver) data, and a payload. Further details regarding information that may be included in a message, and included within the message data stored in the message table 306 is described below with reference to FIG. 4.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization) interest-based or activity-based, merely for example.

The profile data 302 stores multiple types of profile data about a particular entity. The profile data 302 may be selectively used and presented to other users of the messaging system 100, based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations), if any. Avatar representations (e.g., physical appearance, clothing, status, activity) may be selected by a user in conjunction with the avatar characteristics table 318 discussed below. A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 124 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on the client device 102 and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a Story or a gallery). The creation of a particular collection may be initiated by a particular user (e.g., each user for which a record is maintained in the entity table 308). A user may create a "personal Story" in the form of a collection of content that has been created and sent/broadcast by that user. To this end, the user interface of the messaging client 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from varies locations and events. Users whose client devices have location services enabled and are at a common location event at a particular time may, for example, be presented with an option, via a user interface of the messaging client 104, to contribute content to a particular live Story. The live Story may be identified to the user by the messaging client 104, based on his or her location. The end result is a "live Story" told from a community perspective.

A further type of content collection is known as a "location Story," which enables a user whose client device 102 is located within a specific geographic location (e.g., on a college or university campus) to contribute to a particular collection. In some examples, a contribution to a location Story may require a second degree of authentication to verify that the end user belongs to a specific organization or other entity (e.g., is a student on the university campus).

As mentioned above, the video table 314 stores video data that, in one example, is associated with messages for which records are maintained within the message table 306. Similarly, the image table 316 stores image data associated with messages for which message data is stored in the entity table 308. The entity table 308 may associate various augmentations from the augmentation table 310 with various images and videos stored in the image table 316 and the video table 314.

An avatar characteristics table 318 stores a collection of available characteristics for facilitating the generation/editing of avatars. In conjunction with the avatar system 214, a user may create, edit and/or otherwise maintain a personalized avatar, based on the selecting from among the available options within the avatar characteristics table 318. As noted above, user-selected avatar representation(s) may be stored in association with user profiles in the profile data 302.

In one or more embodiments, the avatar characteristics table 318 stores a set of available physical features to represent an avatar, such as face shape, skin tone, hair features (e.g., color, length, type, style), jaw shape, eyebrows, mouth and the like. Moreover, the avatar characteristics table 318 stores a set of available articles of clothing and/or outfits for an avatar, such as shirts, pants/shorts, jackets, shoes, headwear and/or other traditional clothing items (e.g., including preset combinations of articles of clothing corresponding to outfits).

In one or more embodiments, the avatar characteristics table 318 stores attribute(s) in association with article(s) of clothing and/or outfits. For example, a particular article of clothing may be associated with one or more predefined words using metadata labels, designations, and the like that associate with a clothing type (e.g., shirt, pants/shorts, a jacket, shoes, or headwear), color, size, style, and/or brand name.

Figure 4:
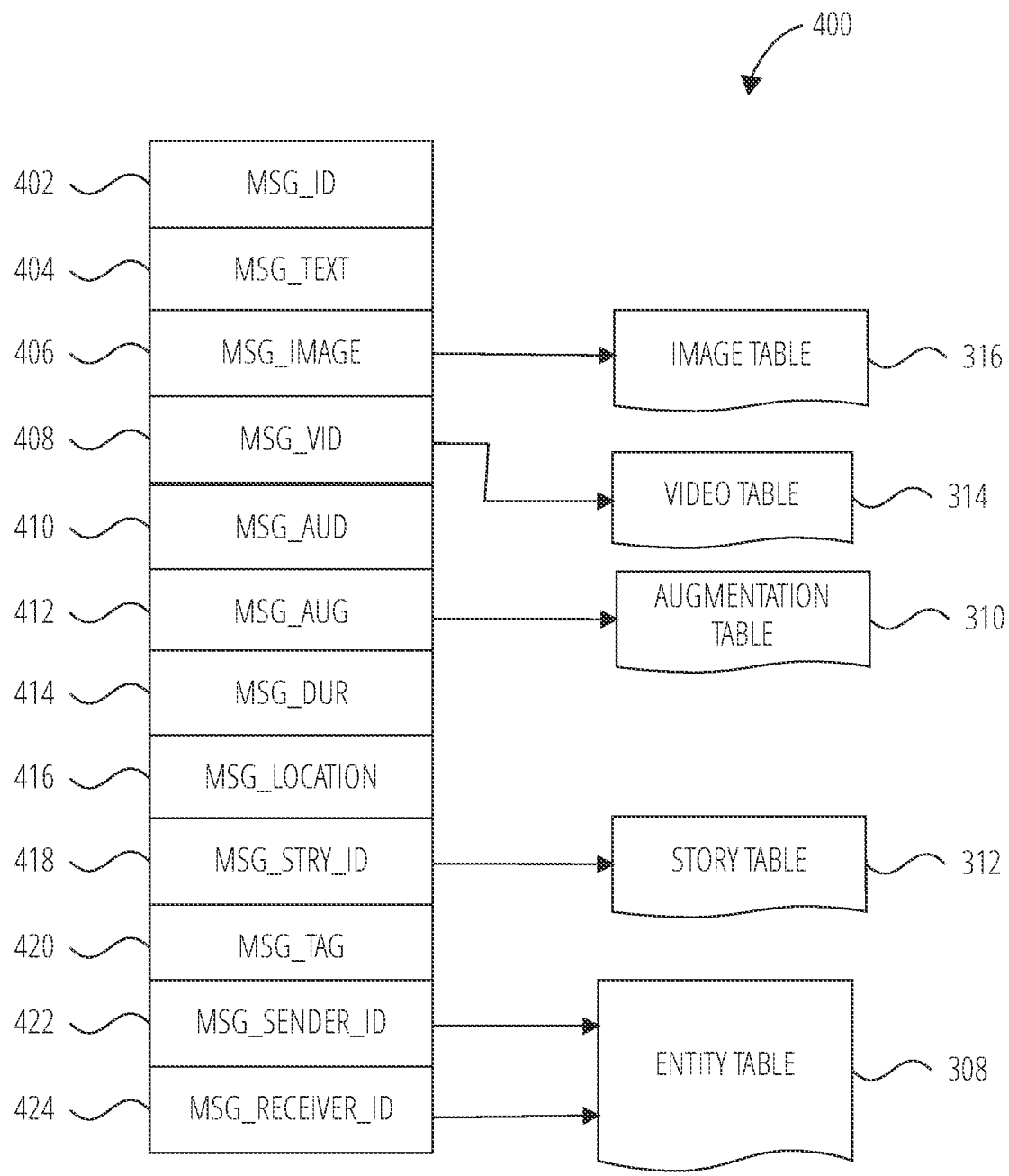
FIG. 4 is a diagrammatic representation of a message, in accordance with some example embodiments.

FIG. 4 is a schematic diagram illustrating a structure of a message 400, according to some examples, generated by a messaging client 104 for communication to a further messaging client 104 or the messaging server 116. The content of a particular message 400 is used to populate the message table 306 stored within the database 124, accessible by the messaging server 116. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "Stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 308.

Figure 5:
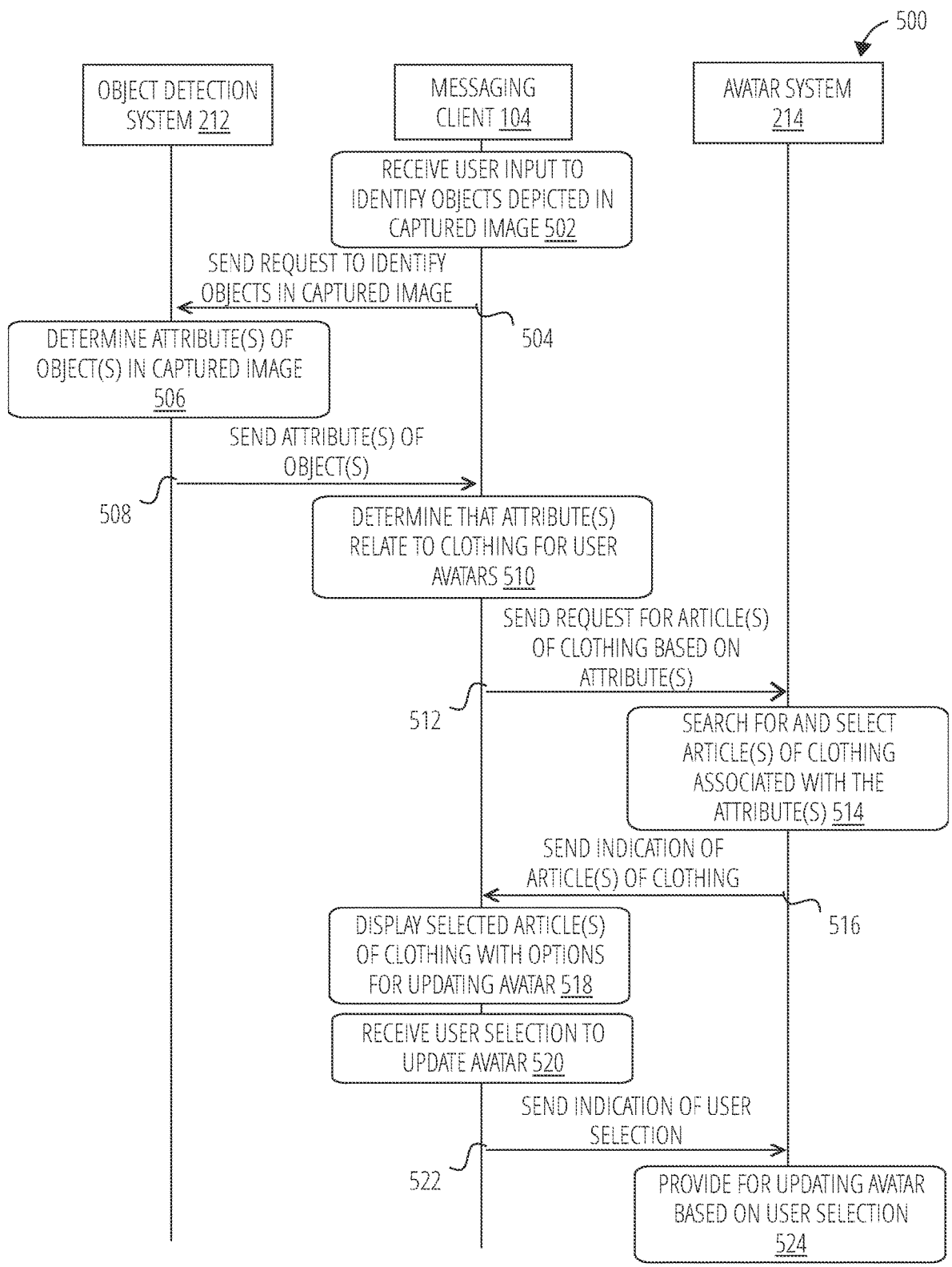
FIG. 5 is an interaction diagram illustrating a process for updating avatar clothing of a user of a messaging system, in accordance with some example embodiments.

FIG. 5 is an interaction diagram illustrating a process for updating avatar clothing of a user of a messaging system, in accordance with some example embodiments. For explanatory purposes, the process 500 is primarily described herein with reference to the messaging client 104 of FIG. 1, and the object detection system 212 and the avatar system 214 of FIG. 2. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

The messaging client 104 may be associated with a respective user of the messaging server system 108, and the user may be associated with a user account of the messaging server system 108. As noted above, the user may be identified by the messaging server system 108 based on a unique identifier (e.g., a messaging system identifier, email address and/or a device identifier) associated with the user account for that user. In addition, the messaging server system 108 may implement and/or work in conjunction with the social network server 120 which is configured to identify other users (e.g., friends) with which a particular user has relationships.

As described herein, the messaging client 104 (e.g., in conjunction with the messaging server system 108) is configured to detect articles of clothing in a captured image (e.g., a live video feed captured by a device camera, or an image selected from a photo library), and to present a user interface with user-selectable avatar outfits that match the detected articles of clothing. For example, the messaging client 104 determines attributes (e.g., types of clothing, color, size, brand name) of articles of clothing detected in the captured image. The messaging client 104 then provides for searching a database (e.g., the database 124, including the avatar characteristics table 318) which stores available articles of clothing and/or outfits based on the attributes, and for selecting one or more outfits that most closely matches the attributes. The messaging client 104 presents a user interface which displays the selected outfits together with interface elements to update the user avatar based on the selected outfits.

At block 502, the messaging client 104 receives user input to identify objects depicted in a captured image. in one or more embodiments, the messaging client 104 activates the camera of the client device 102 (e.g., upon startup of the messaging client 104). The messaging client 104 allows a user to request to scan one or more items in a camera feed captured by the camera. In one or more embodiments, the messaging client 104 detects physical contact between a finger of the user's hand and a region of the touch screen for a threshold period of time. For example, the messaging client 104 determines that the user touched and held their finger on the screen for a threshold time (e.g., two seconds).

Alternatively or in addition, the messaging client 104 receives a user selection of a dedicated scan option (e.g., a button) presented together with the camera feed. In response, the messaging client 104 captures an image being displayed on the screen and processes the image to identify multiple objects based in the image. In an alternative embodiment, the captured image may correspond to an image/video stored in association with the user of the client device 102, for example, within a photo library (e.g., associated with an operating system of the client device 102 and/or associated with a user profile with respect to the messaging system 100).

The messaging client 104 sends, to the object detection system 212, a request to identify objects in the captured image (operation 504). The request may include the image data itself (e.g., if being captured in real time and/or stored locally on the client device 102). Alternatively, the request may reference a remote image (e.g., if stored in association with a user profile with respect to the messaging system 100).

The object detection system 212 determines attribute(s) of object(s) in the captured image (block 506). As noted above, the object detection system 212 may correspond to a subsystem of the messaging system 100, and may be supported on the client side by the messaging client 104 and/or on the server side by the application servers 114. In one or more embodiments, the detection of object(s) within a captured image may be implemented client side, server side and/or a combination of client side and server side.

As further noted above, the object detection system 212 is configured to implement or otherwise access object recognition algorithms (e.g., including machine learning algorithms) configured to scan a captured image, and to detect/track the movement of objects within the image. For example, the object detection system 212 may detect object(s) in the captured image resembling article(s) of clothing. In another example, the object detection system 212 may detect an object in the image corresponding to a barcode (e.g., a Universal Product Code (UPC) code, QR code, or the like) associated with article(s) of clothing. In yet another example, the object detection system 212 may detect a combination of object(s) and/or barcode(s), depicted in the captured image, corresponding to clothing.

The object detection system 212 is further configured to determine or otherwise access attributes of the identified objects. For example, with respect to objects corresponding to articles of clothing, the object detection system 212 may determine attributes such as the type (e.g., shirt, pants/shorts, a jacket, shoes, or headwear), color, size, style, and/or brand name. As noted above, the object detection system 212 may determine attribute(s) corresponding to a keyword that has been sponsored by a third party. For example, a third party (e.g., clothing manufacturer, advertising company) may sponsor or pay for certain keywords (e.g., related to clothing) to be ranked higher than others. In response to determining that a given attribute corresponds to a sponsored keyword, the object detection system 212 may provide for a higher ranking of that attribute relative to other attributes.

The object detection system 212 sends, to the messaging client 104, attribute(s) of the object(s) to the messaging client 104 (operation 508). In doing so, the object detection system 212 may further provide ranking information of the attribute(s). Based on the received attribute(s) and/or ranking information, the messaging client 104 (e.g., in conjunction with the messaging server system 108) determines that at least one of the received attribute(s) relates to clothing for user avatars (block 510).

The messaging client 104 sends, to the avatar system 214, a request for article(s) of clothing based on the at least one attribute (e.g., one or more of clothing type, color, size, style and/or brand name) that relates to avatar clothing (operation 512). For example, if a single article of clothing is depicted in the captured image, the request may include attribute(s) related to the single article of clothing. In another example, if multiple articles of clothing are depicted in the captured image, the request may include respective attribute(s) for the multiple articles of clothing.

The avatar system 214 searches and selects article(s) of clothing that are associated with the attribute(s) received from the messaging client 104 (block 514). As noted above, the avatar system 214 may correspond to a subsystem of the messaging system 100, and may be supported on the client side by the messaging client 104 and/or on the server side by the application servers 114. In one or more embodiments, the selection of article(s) of clothing based on attribute(s) via the avatar system 214 may be implemented client side, server side and/or a combination of client side and server side.

The avatar system 214 is configured to search the avatar characteristics table 318 for one or more article(s) of clothing corresponding to the attribute(s) received from the messaging client 104. As noted above, the avatar characteristics table 318 stores attribute(s) in association with article(s) of clothing and/or outfits. Thus, the avatar system 214 may perform the search by comparing the received attribute(s) (e.g., clothing type color, size, style, and/or brand name) with corresponding attribute fields stored in association with clothing within the avatar characteristics table 318.

In one or more embodiments, the avatar system 214 may prioritize higher-ranked clothing attribute(s) over lower-ranked clothing attribute(s). In a case where the attribute(s) correspond to multiple articles of clothing, the avatar system 214 may select a respective number of article(s) of clothing based on the attribute(s). In a case where the attribute(s) correspond to a single article of clothing, the avatar system 214 may select a single article of clothing corresponding to the attribute(s) or alternatively, may select an entire outfit which includes additional articles of clothing that are predefined to be associated with the selected single article of clothing.

The avatar system 214 may calculate respective relevancy scores for article(s) of clothing and/or entire outfits, for example, based on a number or frequency of confirmed matches between matching attributes. The relevancy scores may be used to limit the number of articles of clothing and/or outfits that are selected (e.g., a predefined number, such as three outfits) and/or for displaying the selected articles of clothing and/or outfits in ranked order.

Upon completion of the search and/or upon selecting a predetermined number of matching articles of clothing, the avatar system 214 sends an indication of the selected article(s) of clothing to the messaging client 104 (operation 516), together with relevancy scores, if applicable. The messaging client 104 displays the selected article(s) of clothing, together with user interface options for updating the avatar of the user (block 518). The messaging client 104 receives user input selecting to update the avatar of the user (block 520).

As discussed below with respect to FIGS. 6A-6B, the user interface options may include an option (e.g., a first button) for the user to update their avatar based on user selection of one or more articles of clothing provided by the avatar system 214. Alternatively or in addition, the user interface options may include an option (e.g., a second button) for the user to redirect to an outfit selection interface. In one or more embodiments, the outfit selection interface is configured to present an expanded set of article(s) of clothing and/or outfits (e.g., all available article(s) of clothing in the avatar characteristics table 318, as opposed to the select articles of clothing provided by the avatar system 214).

The messaging client 104 sends an indication of the user selection to the avatar system 214 (operation 522). The avatar system 214 provides for updating the avatar of the user based on the indication of the user selection received from the messaging client 104 (block 524). For example, if the user selects the first button, the avatar system 214 provides for updating the avatar of the user based on user selection of one or more articles of clothing provided by the avatar system 214. In another example, if the user selects the second button, the avatar system 214 provides for updating the avatar based on user selection of clothing options presented within the expanded outfit selection interface. The avatar system 214 is configured to update the avatar, such that the updated outfit persists across multiple interfaces of the messaging system 100 (e.g., by being stored in association with the user's profile within the profile data 302).

Figure 6B:
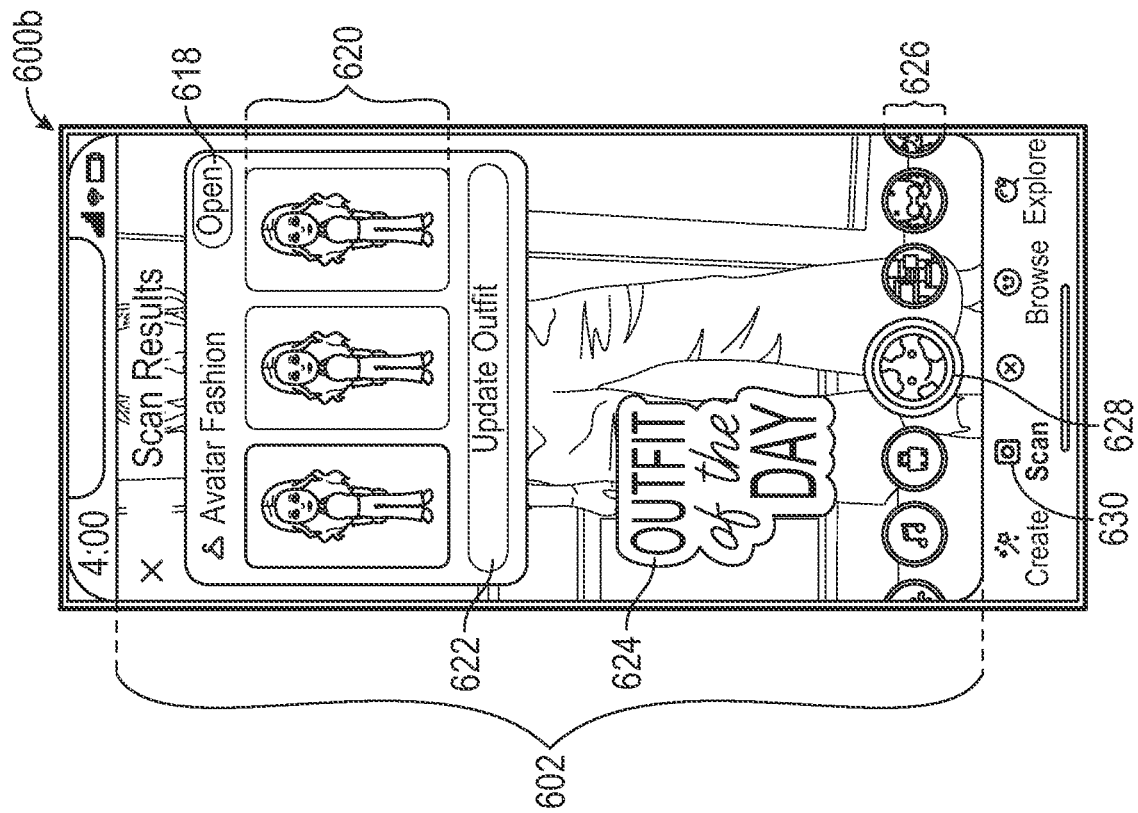
FIG. 6B illustrates an example user interface for selecting avatar clothing based on detected clothing, in accordance with some example embodiments.
Figure 6A:
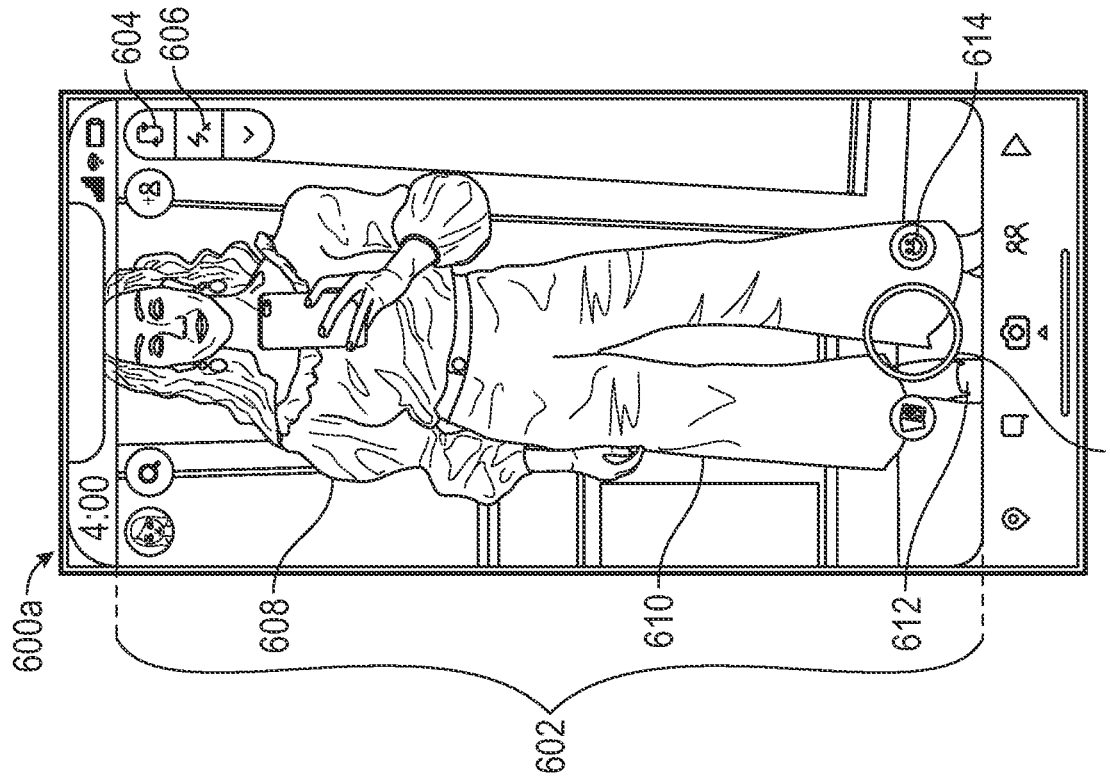
FIG. 6A illustrates an example user interface for detecting clothing in a captured image, in accordance with some example embodiments.

FIG. 6A illustrates an example user interface 600a for detecting clothing in a captured image 602, in accordance with some example embodiments. The user interface 600a includes a camera selection button 604, a flash button 606, a carousel interface launch button 614 and a shutter button 616, as well as detected articles of clothing including a shirt 608, pants 610 and shoes 612.

In the example of FIG. 6A, a user of the client device 102 captures an image (e.g., a live video feed) from a rear-facing camera of the client device 102. In this example, the captured image 602 corresponds to a reflection of the user in a mirror. As shown, the captured image 602 depicts the user wearing an outfit including the shirt 608, pants 610 and shoes 612.

While the example of FIG. 6A illustrates the captured image 602 as captured by a rear-facing camera of the client device 102, it is possible for the messaging client 104 to instead capture an image (e.g., a live video feed) from a front-facing camera. For example, camera selection button 604 corresponds to a user-selectable button for switching between the rear-facing and front-facing camera of the client device 102.

The user interface 600a further includes a flash button 606 for activating or deactivating a flash with respect to the captured image 602. In addition, the user interface 600a includes a carousel interface launch button 614 for launching the carousel interface 626 discussed below with respect to FIG. 6B. Moreover, the user interface 600a includes a shutter button 616 for generating a media content item which includes an image (e.g., in response to a press/tap gesture of the shutter button 616) and/or a video (e.g., in response to a press-and-hold gesture of the shutter button 616) of the screen content, for example, to send to friends, include in a Story, and the like.

As discussed above, the user of the client device 102 may provide touch input to the messaging client 104, to perform a scan operation to identify objects in the captured image 602. For example, the touch input corresponds to a press-and-hold gesture (e.g., of at least one second) at a predefined portion of the user interface 600a (e.g., a portion of the device screen in which the captured image 602 is being displayed).

In one or more embodiments, during the scan operation, the messaging client 104 is configured to display a scanning graphic (not shown) to indicate that the messaging client 104 is performing a scan operation. For example, the scanning graphic corresponds to an animation that is displayed for the duration of the scan (e.g., a predetermined duration of 2 seconds).

In response to receiving the touch input, the messaging client 104 (e.g., in conjunction with the object detection system 212) is configured to detect objects in the captured image 602, as well as attribute(s) of the detected objects. For example, the object detection system 212 detects attribute(s) associated the shirt 608, pants 610 and shoes 612. In response to determining that the attribute(s) relate to clothing, the messaging client 104 (in conjunction with the avatar system 214) is configured to select articles of avatar clothing associated with the attributes of the detected shirt 608, pants 610 and shoes 612. In addition, the messaging client 104 is configured to display the selected articles of clothing with the avatar of the user as discussed below with respect to FIG. 6B.

FIG. 6B illustrates an example user interface 600b for selecting avatar clothing based on detected clothing, in accordance with some example embodiments. The user interface 600b includes the captured image 602, an outfit interface launch button 618, an outfit suggestion list 620, an outfit update button 622, supplemental outfit information 624, a carousel interface 626 and a scan button 630.

The outfit suggestion list 620 includes user-selectable outfits for updating the avatar of the user. As noted above, the avatar system 214 may have selected a preset number of articles of clothing and/or outfits (e.g., three outfits) corresponding to attributes of the detected shirt 608, pants 610 and shoes 612. The three selected outfits are presented within the outfit suggestion list 620.

The outfit update button 622 corresponds to a user-selectable button to update the user's avatar based on the outfit selected within the outfit suggestion list 620. In response to selection of the outfit update button 622, the avatar system 214 provides for persistently updating the user's avatar with the selected outfit (e.g., in association with the user's profile within the profile data 302).

On the other hand, the outfit interface launch button 618 corresponds to a user-selectable button to redirect to an outfit selection interface within the messaging client 104. As noted above, the outfit selection interface is configured to present an expanded set of article(s) of clothing and/or outfits for persistently updating the outfit for the user's avatar (e.g., in association with the user's profile within the profile data 302).

As shown in the example of FIG. 6B, the user interface 600b further includes supplemental outfit information 624. The supplemental outfit information 624 may correspond to an overlay with a phrase (e.g., "outfit of the day") to supplement the outfit selections/suggestions associated with interface elements 618-622.

In one or more embodiments, the user interface 600b includes a carousel interface 626 which allows the user to cycle through and/or select different augmented reality content items to apply/display with respect to the captured image 602. Each of the available augmented reality content items is represented by an icon which is user-selectable for switching to the respective augmented reality content item. In one or more embodiments, the icon corresponding to an active augmented reality content item (e.g., a selected AR icon 628) is displayed in a different manner relative to (e.g., larger than) the remaining icons. User selection of the selected AR icon 628 provides for generating a media content item which includes an image (e.g., in response to a press/tap gesture of the selected AR icon 628) and/or a video (e.g., in response to a press-and-hold gesture of the selected AR icon 628) of the screen content, for example, to send to friends, include in a Story, and the like.

Moreover, the user interface 600b includes a scan button 630. For example, the scan button 630 corresponds to a dedicated button for the user to perform a subsequent scan operation (e.g., as an alternative to the above-mentioned press-and-hold gesture for scanning).

Figure 7:
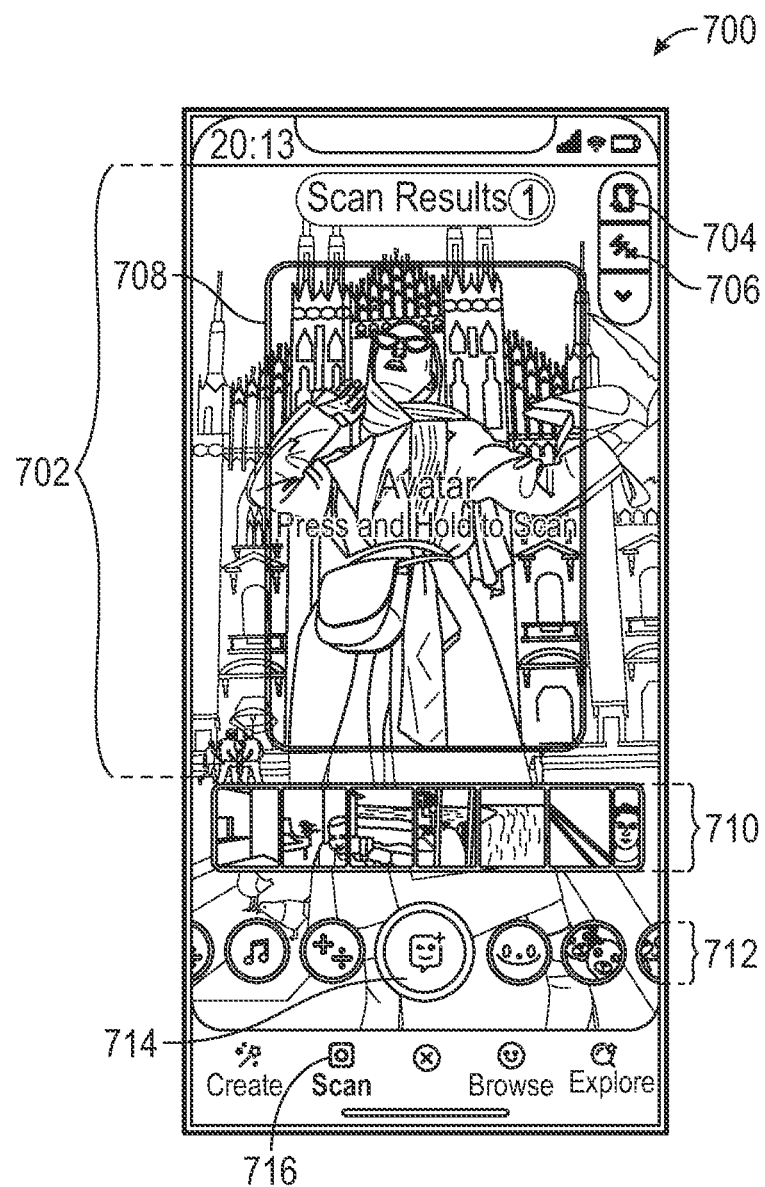
FIG. 7 illustrates another example user interface for detecting clothing in a captured image, in accordance with some example embodiments.

FIG. 7 illustrates another example user interface user interface 700 for detecting clothing in a captured image 702, in accordance with some example embodiments. The user interface 700 includes a captured image 702, a flash button 706, a scan prompt 708, a photo selector 710, an avatar scan icon 714, and a scan button 716.

As noted above, the carousel interface 712 allows the user to cycle through and/or select different augmented reality content items to apply/display with respect to the captured image 702. One such augmented reality content item is represented by the avatar scan icon 714. User selection of the avatar scan icon 714 provides for the user to initiate a scan operation. For example, in response to user selection of the avatar scan icon 714, the messaging client 104 provides for display of the scan prompt 708 and the photo selector 710. The scan prompt 708 prompts the user to perform the scan operation (e.g., via the above-described press-and-hold gesture) with respect to a live video feed. On the other hand, the photo selector 710 provides for the user to perform the scan operation with respect to a selected image/video stored in memory. As noted above, the stored image/video may be selected from a photo library stored locally on the device, and/or stored from a photo library associated with a profile of the user with respect to the messaging system 100.

In response to user input associated with the scan prompt 708 and/or the photo selector 710, the messaging client 104 provides for determining attribute(s) of object(s) (e.g., jacket, scarf, sunglasses) depicted in the captured image 702, selecting an article of clothing that is associated with the attribute(s) of the object(s), and displaying the selected article(s) of clothing with the avatar of the user (e.g., similar to FIG. 6B above). In the example of FIG. 7, the user interface 700 further includes the camera selection button 704 for switching between front-facing and rear-facing cameras, the flash button 706 for activating and/or deactivating flash for the captured image 702, and a scan button 716 for performing a subsequent scan operation.

Figure 8:
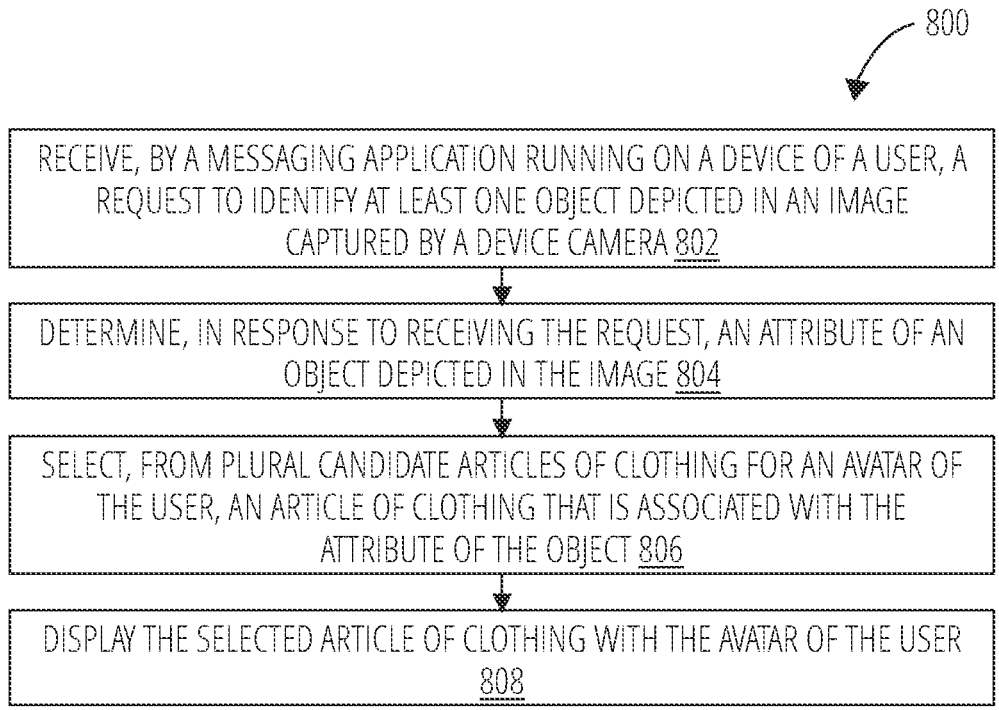
FIG. 8 is a flowchart illustrating a process for updating avatar clothing of a user of a messaging system, in accordance with some example embodiments.

FIG. 8 is a flowchart illustrating a process 800 for updating avatar clothing of a user of a messaging system, in accordance with some example embodiments. For explanatory purposes, the process 800 is primarily described herein with reference to the messaging client 104 of FIG. 1, and the object detection system 212 and the avatar system 214 of FIG. 2. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The messaging client 104 receives a request to identify at least one object depicted in an image captured by a device camera (block 802). The image may correspond to a live feed of the device camera. Alternatively or in addition, the image may correspond to a saved image included in a photo library associated with the user.

The messaging client 104 determines, in response to receiving the request, an attribute of an object depicted in the image (block 804). The messaging client 104 selects, from plural candidate articles of clothing for an avatar of the user, an article of clothing that is associated with the attribute of the object (block 806).

The object depicted in the image may resemble (correspond to) the article of clothing. Alternatively or in addition, the object depicted in the image may correspond to a barcode associated with the article of clothing.

The messaging client 104 displays the selected article of clothing with the avatar of the user (block 808). The messaging client 104 may display a user-selectable interface element for updating an outfit of the avatar with the article of clothing. The messaging client 104 may receive user selection of the user-selectable interface element, and update, in response to receiving the user selection, a profile of the user such that the article of clothing is persistently associated with the outfit of the avatar. Alternatively or in addition, the messaging client 104 may display a second user-selectable element for redirecting to an outfit selection interface for selecting the outfit of the avatar, receive user selection of the second user-selectable element, and redirect, in response to receiving the user selection, to the outfit selection interface.

The messaging client 104 may determine, in response to receiving the request, at least one second attribute of at least one second object depicted in the image, select, from the plural candidate articles of clothing for the avatar of the user, at least one second article of clothing that is associated with the at least one second attribute of the at least one second object, and display the selected article of clothing and the at least one second article of clothing with the avatar of the user.

Figure 9:
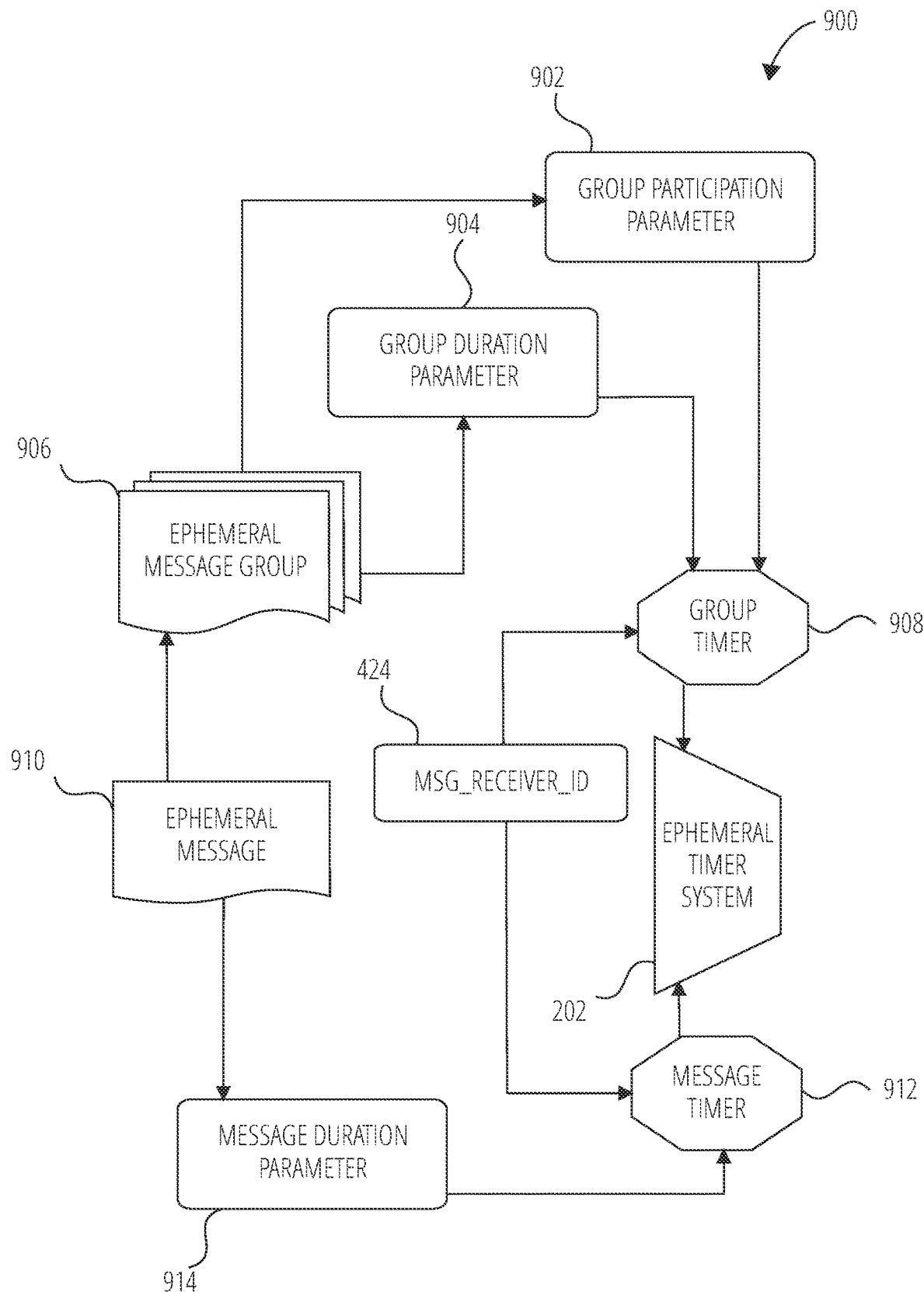
FIG. 9 is a flowchart for an access-limiting process, in accordance with some example embodiments.

FIG. 9 is a schematic diagram illustrating an access-limiting process 900, in terms of which access to content (e.g., an ephemeral message 910, and associated multimedia payload of data) or a content collection (e.g., an ephemeral message group 906) may be time-limited (e.g., made ephemeral).

An ephemeral message 910 is shown to be associated with a message duration parameter 914, the value of which determines an amount of time that the ephemeral message 910 will be displayed to a receiving user of the ephemeral message 910 by the messaging client 104. In one example, an ephemeral message 910 is viewable by a receiving user for up to a maximum of 10 seconds, depending on the amount of time that the sending user specifies using the message duration parameter 914.

The message duration parameter 914 and the message receiver identifier 424 are shown to be inputs to a message timer 912, which is responsible for determining the amount of time that the ephemeral message 910 is shown to a particular receiving user identified by the message receiver identifier 424. In particular, the ephemeral message 910 will only be shown to the relevant receiving user for a time period determined by the value of the message duration parameter 914. The message timer 912 is shown to provide output to a more generalized ephemeral timer system 202, which is responsible for the overall timing of display of content (e.g., an ephemeral message 910) to a receiving user.

The ephemeral message 910 is shown in FIG. 9 to be included within an ephemeral message group 906 (e.g., a collection of messages in a personal Story, or an event Story). The ephemeral message group 906 has an associated group duration parameter 904, a value of which determines a time duration for which the ephemeral message group 906 is presented and accessible to users of the messaging system 100. The group duration parameter 904, for example, may be the duration of a music concert, where the ephemeral message group 906 is a collection of content pertaining to that concert. Alternatively, a user (either the owning user or a curator user) may specify the value for the group duration parameter 904 when performing the setup and creation of the ephemeral message group 906.

Additionally, each ephemeral message 910 within the ephemeral message group 906 has an associated group participation parameter 902, a value of which determines the duration of time for which the ephemeral message 910 will be accessible within the context of the ephemeral message group 906. Accordingly, a particular ephemeral message group 906 may "expire" and become inaccessible within the context of the ephemeral message group 906, prior to the ephemeral message group 906 itself expiring in terms of the group duration parameter 904. The group duration parameter 904, group participation parameter 902, and message receiver identifier 424 each provide input to a group timer 908, which operationally determines, firstly, whether a particular ephemeral message 910 of the ephemeral message group 906 will be displayed to a particular receiving user and, if so, for how long. Note that the ephemeral message group 906 is also aware of the identity of the particular receiving user as a result of the message receiver identifier 424.

Accordingly, the group timer 908 operationally controls the overall lifespan of an associated ephemeral message group 906, as well as an individual ephemeral message 910 included in the ephemeral message group 906. In one example, each and every ephemeral message 910 within the ephemeral message group 906 remains viewable and accessible for a time period specified by the group duration parameter 904. In a further example, a certain ephemeral message 910 may expire, within the context of ephemeral message group 906, based on a group participation parameter 902. Note that a message duration parameter 914 may still determine the duration of time for which a particular ephemeral message 910 is displayed to a receiving user, even within the context of the ephemeral message group 906. Accordingly, the message duration parameter 914 determines the duration of time that a particular ephemeral message 910 is displayed to a receiving user, regardless of whether the receiving user is viewing that ephemeral message 910 inside or outside the context of an ephemeral message group 906.

The ephemeral timer system 202 may furthermore operationally remove a particular ephemeral message 910 from the ephemeral message group 906 based on a determination that it has exceeded an associated group participation parameter 902. For example, when a sending user has established a group participation parameter 902 of 24 hours from posting, the ephemeral timer system 202 will remove the relevant ephemeral message 910 from the ephemeral message group 906 after the specified 24 hours. The ephemeral timer system 202 also operates to remove an ephemeral message group 906 when either the group participation parameter 902 for each and every ephemeral message 910 within the ephemeral message group 906 has expired, or when the ephemeral message group 906 itself has expired in terms of the group duration parameter 904.

In certain use cases, a creator of a particular ephemeral message group 906 may specify an indefinite group duration parameter 904. In this case, the expiration of the group participation parameter 902 for the last remaining ephemeral message 910 within the ephemeral message group 906 will determine when the ephemeral message group 906 itself expires. In this case, a new ephemeral message 910, added to the ephemeral message group 906, with a new group participation parameter 902, effectively extends the life of an ephemeral message group 906 to equal the value of the group participation parameter 902.

Responsive to the ephemeral timer system 202 determining that an ephemeral message group 906 has expired (e.g., is no longer accessible), the ephemeral timer system 202 communicates with the messaging system 100 (and, for example, specifically the messaging client 104) to cause an indicium (e.g., an icon) associated with the relevant ephemeral message group 906 to no longer be displayed within a user interface of the messaging client 104. Similarly, when the ephemeral timer system 202 determines that the message duration parameter 914 for a particular ephemeral message 910 has expired, the ephemeral timer system 202 causes the messaging client 104 to no longer display an indicium (e.g., an icon or textual identification) associated with the ephemeral message 910.

Figure 10:
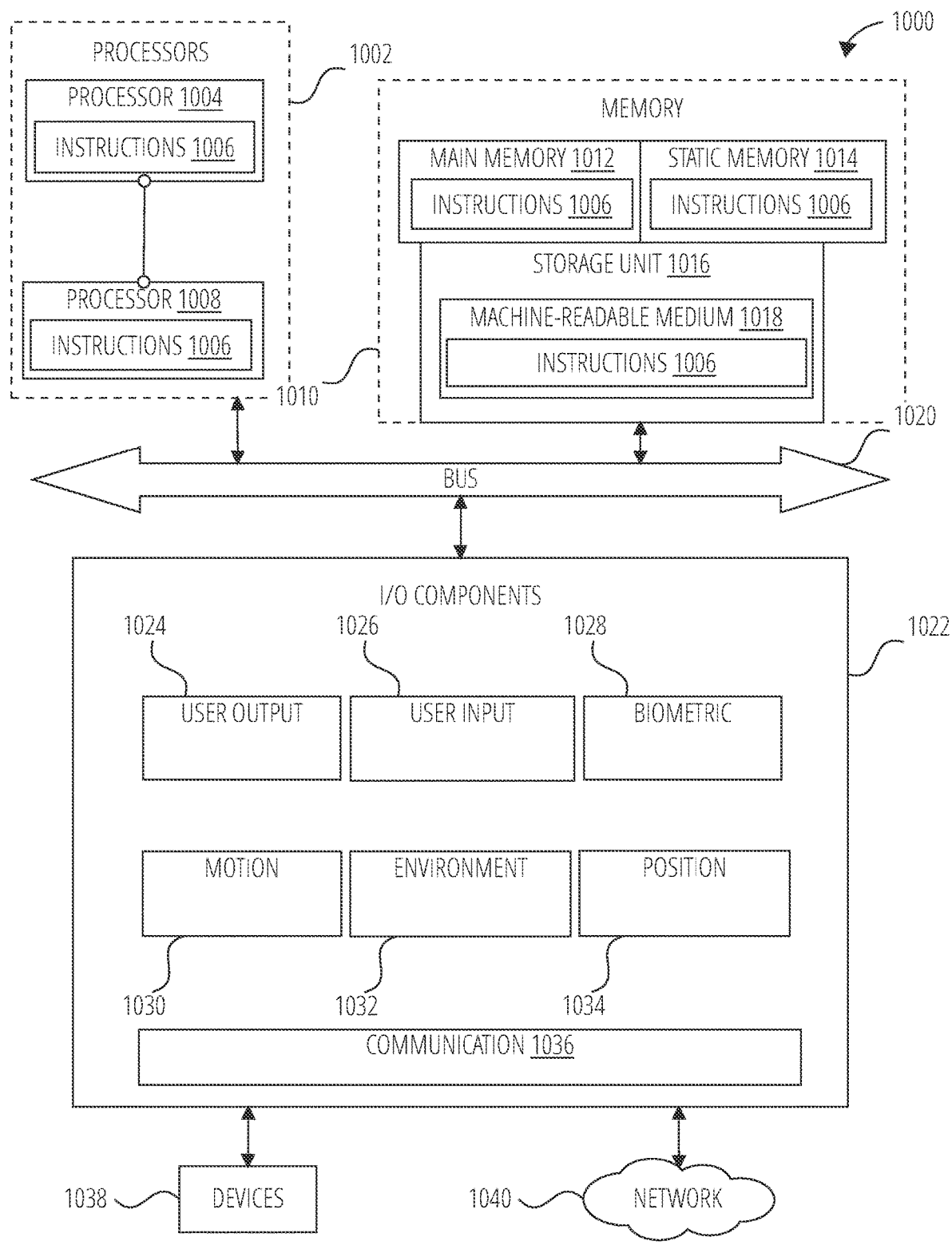
FIG. 10 is a diagrammatic representation of a machine in the form of a computer system within which a set of instructions may be executed for causing the machine to perform any one or more of the methodologies discussed herein, in accordance with some example embodiments.

FIG. 10 is a diagrammatic representation of the machine 1000 within which instructions 1006 (e.g., software, a program, an application, an applet, an app, or other executable code) for causing the machine 1000 to perform any one or more of the methodologies discussed herein may be executed. For example, the instructions 1006 may cause the machine 1000 to execute any one or more of the methods described herein. The instructions 1006 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1006, sequentially or otherwise, that specify actions to be taken by the machine 1000. Further, while only a single machine 1000 is illustrated, the term "machine" shall also be taken to include a collection of machines that individually or jointly execute the instructions 1006 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1010, and input/output I/O components 1022, which may be configured to communicate with each other via a bus 1020. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1004 and a processor 1008 that execute the instructions 1006. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1010 includes a main memory 1012, a static memory 1014, and a storage unit 1016, both accessible to the processors 1002 via the bus 1020. The main memory 1010, the static memory 1014, and storage unit 1016 store the instructions 1006 embodying any one or more of the methodologies or functions described herein. The instructions 1006 may also reside, completely or partially, within the main memory 1012, within the static memory 1014, within machine-readable medium 1018 within the storage unit 1016, within at least one of the processors 1002 (e.g., within the Processor's cache memory), or any suitable combination thereof, during execution thereof by the machine 1000.

The I/O components 1022 may include a wide variety of components to receive input, provide output, produce output, transmit information, exchange information, capture measurements, and so on. The specific I/O components 1022 that are included in a particular machine will depend on the type of machine. For example, portable machines such as mobile phones may include a touch input device or other such input mechanisms, while a headless server machine will likely not include such a touch input device. It will be appreciated that the I/O components 1022 may include many other components that are not shown in FIG. 10. In various examples, the I/O components 1022 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1022 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1022 further include communication components 1036 operable to couple the machine 1000 to a network 1040 or devices 1038 via respective coupling or connections. For example, the communication components 1036 may include a network interface Component or another suitable device to interface with the network 1040. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1038 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1006), when executed by processors 1002, cause various operations to implement the disclosed examples.

The instructions 1006 may be transmitted or received over the network 1040, using a transmission medium, via a network interface device (e.g., a network interface component included in the communication components 1036) and using any one of several well-known transfer protocols (e.g., hypertext transfer protocol (HTTP)). Similarly, the instructions 1006 may be transmitted or received using a transmission medium via a coupling (e.g., a peer-to-peer coupling) to the devices 1038.

Figure 11:
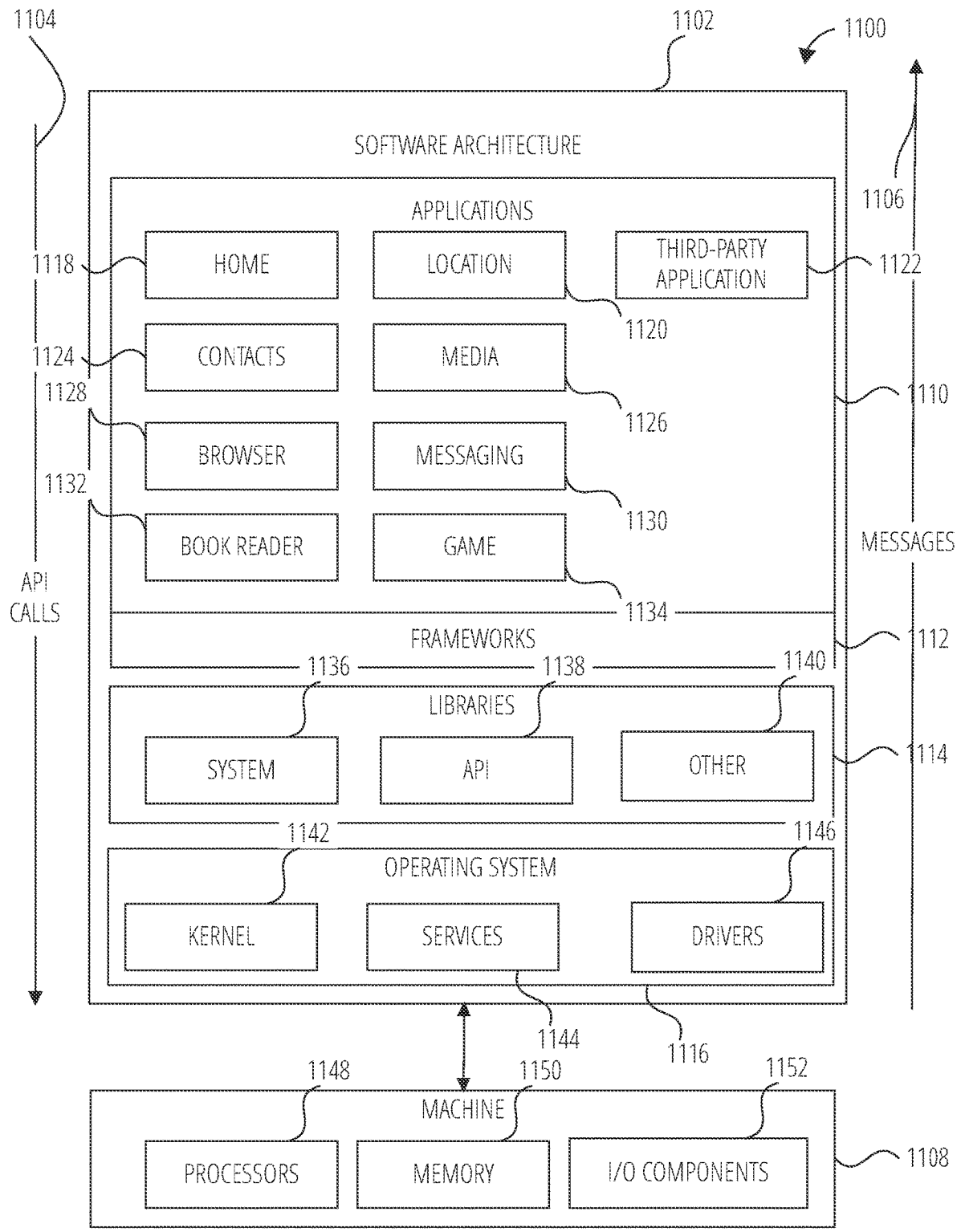
FIG. 11 is a block diagram showing a software architecture within which examples may be implemented, in accordance with some example embodiments.

FIG. 11 is a block diagram 1100 illustrating a software architecture 1102, which can be installed on any one or more of the devices described herein. The software architecture 1102 is supported by hardware such as a machine 1108 that includes processors 1148, memory 1150, and I/O components 1152. In this example, the software architecture 1102 can be conceptualized as a stack of layers, where each layer provides a particular functionality. The software architecture 1102 includes layers such as an operating system 1116, libraries 1114, frameworks 1112, and applications 1110. Operationally, the applications 1110 invoke API calls 1104 through the software stack and receive messages 1106 in response to the API calls 1104.

The operating system 1116 manages hardware resources and provides common services. The operating system 1116 includes, for example, a kernel 1142, services 1144, and drivers 1146. The kernel 1142 acts as an abstraction layer between the hardware and the other software layers. For example, the kernel 1142 provides memory management, processor management (e.g., scheduling), component management, networking, and security settings, among other functionality. The services 1144 can provide other common services for the other software layers. The drivers 1146 are responsible for controlling or interfacing with the underlying hardware. For instance, the drivers 1146 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1110. The libraries 1114 can include system libraries 1136 (e.g., C standard library) that provide functions such as memory allocation functions, string manipulation functions, mathematic functions, and the like. In addition, the libraries 1114 can include API libraries 1138 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1140 to provide many other APIs to the applications 1110.

The frameworks 1112 provide a common high-level infrastructure that is used by the applications 1110. For example, the frameworks 1112 provide various graphical user interface (GUI) functions, high-level resource management, and high-level location services. The frameworks 1112 can provide a broad spectrum of other APIs that can be used by the applications 1110, some of which may be specific to a particular operating system or platform.

In an example, the applications 1110 may include a home application 1118, a contacts application 1124, a browser application 1128, a book reader application 1132, a location application 1120, a media application 1126, a messaging application 1130, a game application 1134, and a broad assortment of other applications such as a third-party application 1122. The applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1122 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1122 can invoke the API calls 1104 provided by the operating system 1116 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
    displaying, by a messaging application running on a device associated with a user, a user interface in which a camera of the device is activated to capture a real-time image, the user interface including a carousel interface comprising plural icons, the plural icons including a first icon which is user-selectable to update an avatar of the user for the messaging application based on performing a scan operation, the plural icons further including second icons each of which is user-selectable to apply respective augmented reality content in association with the real-time image;
    receiving, by the messaging application, user input selecting the first icon within the carousel interface;
    in response to receiving the user input,
    displaying a scan prompt which is user-selectable to perform the scan operation with respect to the real-time image, and
    displaying a photo selector for user selection of a stored image for performing the scan operation;
    determining, in response to user selection of the scan prompt, an attribute of an object depicted in the real-time image;
    selecting, from plural candidate articles of clothing for the avatar of the user, an article of clothing that is associated with the attribute of the object; and
    displaying the selected article of clothing with the avatar of the user.

2. The method of claim 1, further comprising:
    displaying an outfit update button which is user-selectable to persistently update the avatar of the user based on the article of clothing;
    receiving user selection of the outfit update button; and
    updating, in response to receiving the user selection, a profile of the user such that the article of clothing is persistently associated with the outfit of the avatar.

3. The method of claim 1, further comprising:
    determining, in response to user selection of the scan prompt, at least one second attribute of at least one second object depicted in the image;
    selecting, from the plural candidate articles of clothing for the avatar of the user, at least one second article of clothing that is associated with the at least one second attribute of the at least one second object; and
    displaying the selected article of clothing and the at least one second article of clothing with the avatar of the user.

4. The method of claim 1, wherein the object depicted in the image resembles the article of clothing.

5. The method of claim 1, wherein the object depicted in the image corresponds to a barcode associated with the article of clothing.

6. The method of claim 1, wherein the real-time image corresponds to a live feed of the device camera.

7. The method of claim 1, wherein the stored image is included in a photo library associated with the user.

8. The method of claim 1, further comprising:
    displaying a user interface comprising an outfit suggestion list, an outfit update button and an outfit interface launch button,
    wherein the outfit suggestion list presents outfits for updating the avatar of the user, at least one of the outfits including the selected article of clothing,
    wherein the outfit update button is user-selectable to persistently update the avatar based on user selection of an outfit within the outfit suggestion list, and
    wherein the outfit interface launch button is user-selectable to launch an outfit selection interface which is configured to present an expanded set of outfits for persistently updating the avatar.

9. The method of claim 1, further comprising:
    determining, in response to user selection of the stored image via the photo selector, an attribute of an object depicted in the stored image;
    selecting, from plural candidate articles of clothing for the avatar of the user, an article of clothing that is associated with the attribute of the object; and
    displaying the selected article of clothing with the avatar of the user.

10. A device, comprising:
    a processor; and
    a memory storing instructions that, when executed by the processor, configure the processor to:
    display, by a messaging application running on the device associated with a user, a user interface in which a camera of the device is activated to capture a real-time image, the user interface including a carousel interface comprising plural icons, the plural icons including a first icon which is user-selectable to update an avatar of the user for the messaging application based on performing a scan operation, the plural icons further including second icons each of which is user-selectable to apply respective augmented reality content in association with the real-time image;

receive, by the messaging application, user input selecting the first icon within the carousel interface;

in response to receiving the user input, display a scan prompt which is user-selectable to perform the scan operation with respect to the real-time image, and display a photo selector for user selection of a stored image for performing the scan operation;

determine, in response to user selection of the scan prompt, an attribute of an object depicted in the real-time image;

select, from plural candidate articles of clothing for the avatar of the user, an article of clothing that is associated with the attribute of the object; and display the selected article of clothing with the avatar of the user.

11. The device of claim 10, wherein the instructions further configure the processor to:

display an outfit update button which is user-selectable to persistently update the avatar of the user based on the article of clothing;

receive user selection of the outfit update button; and update, in response to receiving the user selection, a profile of the user such that the article of clothing is persistently associated with the outfit of the avatar.

12. The device of claim 10, wherein the instructions further configure the processor to:

determine, in response to user selection of the scan prompt, at least one second attribute of at least one second object depicted in the image;

select, from the plural candidate articles of clothing for the avatar of the user, at least one second article of clothing that is associated with the at least one second attribute of the at least one second object; and display the selected article of clothing and the at least one second article of clothing with the avatar of the user.

13. The device of claim 10, wherein the object depicted in the image resembles the article of clothing.

14. The device of claim 10, wherein the object depicted in the image corresponds to a barcode associated with the article of clothing.

15. The device of claim 10, wherein the real-time image corresponds to a live feed of the device camera.

16. The device of claim 10, wherein the stored image is included in a photo library associated with the user.

17. A non-transitory computer-readable storage medium, the computer-readable storage medium including instructions that when executed by a computer, cause the computer to:

display, by a messaging application running on a device associated with a user, a user interface in which a camera of the device is activated to capture a real-time image, the user interface including a carousel interface comprising plural icons, the plural icons including a first icon which is user-selectable to update an avatar of the user for the messaging application based on performing a scan operation, the plural icons further including second icons each of which is user-selectable to apply respective augmented reality content in association with the real-time image;

receive, by the messaging application, user input selecting the first icon within the carousel interface;

in response to receiving the user input, display a scan prompt which is user-selectable to perform the scan operation with respect to the real-time image, and display a photo selector for user selection of a stored image for performing the scan operation;

determine, in response to user selection of the scan prompt, an attribute of an object depicted in the real-time image;

select, from plural candidate articles of clothing for the avatar of the user, an article of clothing that is associated with the attribute of the object; and display the selected article of clothing with the avatar of the user.

* * * * *